(12) United States Patent
Dumais

(10) Patent No.: US 10,348,083 B2
(45) Date of Patent: Jul. 9, 2019

(54) AUTOMATIC CLOSURE SYSTEM IMPACT DETECTION

(71) Applicant: Erik Dumais, Ottawa (CA)

(72) Inventor: Erik Dumais, Ottawa (CA)

(*) Notice: Subject to any disclaimer, the term of this patent is extended or adjusted under 35 U.S.C. 154(b) by 269 days.

(21) Appl. No.: 15/006,907

(22) Filed: Jan. 26, 2016

(65) Prior Publication Data

US 2016/0231715 A1     Aug. 11, 2016

Related U.S. Application Data

(60) Provisional application No. 62/108,703, filed on Jan. 28, 2015.

(51) Int. Cl.
| | |
|---|---|
| *G05B 11/06* | (2006.01) |
| *G05B 15/02* | (2006.01) |
| *H02H 7/085* | (2006.01) |
| *E05F 15/41* | (2015.01) |
| *E05F 15/43* | (2015.01) |
| *E05F 15/681* | (2015.01) |
| *E05F 15/42* | (2015.01) |

(52) U.S. Cl.
CPC .......... *H02H 7/0851* (2013.01); *E05F 15/41* (2015.01); *E05F 15/43* (2015.01); *E05F 15/681* (2015.01); *E05F 15/42* (2015.01); *E05F 2015/435* (2015.01); *E05F 2015/436* (2015.01); *E05Y 2900/106* (2013.01)

(58) Field of Classification Search
CPC .......... E05F 15/41; E05F 15/40; E05F 15/70; G08B 13/08; G08B 21/043; G08B 21/0438; G08B 1/00; E05Y 2400/532; E05Y 2400/58; E05Y 2400/32; E05Y 2400/36; E05Y 2400/40; E05Y 2400/44; G05B 11/06
USPC .......... 340/5.71, 545.5, 3.9; 49/30; 318/468, 318/264
See application file for complete search history.

(56) References Cited

U.S. PATENT DOCUMENTS

| | | | |
|---|---|---|---|
| 7,070,226 B2* | 7/2006 | Cleland ................. | E05F 1/1091 296/146.8 |
| 2005/0253710 A1* | 11/2005 | Eskildsen .............. | G08B 13/08 340/545.5 |
| 2009/0113797 A1* | 5/2009 | Hoermann ................ | E06B 9/88 49/26 |

(Continued)

*Primary Examiner* — Jonathan Han
(74) *Attorney, Agent, or Firm* — Greer, Burns & Crain, Ltd.

(57) ABSTRACT

A method is provided, including providing an accelerometer responsive to motion of a closure forming part of an automatic closure system, providing an output of the accelerometer to first and second comparator circuits, the first comparator circuit having a first reference voltage such that the output of the first comparator circuit is indicative of a direction of closure motion and the second comparator circuit having an adjustable second reference voltage such that the output of the second comparator circuit is scaled relative to this adjustable second reference voltage to adjust the sensitivity of the output of the second comparator, providing a microcontroller coupled to the first and second comparator circuits, the microcontroller determining both a motion sequence of the closure and whether the closure has impacted an object, and providing an interface circuit for communicating the output from the microcontroller to a remote controller circuit.

23 Claims, 14 Drawing Sheets

(56) References Cited

U.S. PATENT DOCUMENTS

| | | | | |
|---|---|---|---|---|
| 2009/0261943 A1* | 10/2009 | Jana | ..................... | G08B 25/012 |
| | | | | 340/3.1 |
| 2011/0005138 A1* | 1/2011 | Drifka | ....................... | E06B 9/13 |
| | | | | 49/360 |
| 2011/0016971 A1* | 1/2011 | Yulkowski | ........... | G08B 21/043 |
| | | | | 73/493 |
| 2014/0129606 A1* | 5/2014 | Cate | ........................ | E05F 15/60 |
| | | | | 709/201 |
| 2015/0015369 A1* | 1/2015 | Lamb | ..................... | E05F 15/79 |
| | | | | 340/5.71 |

* cited by examiner

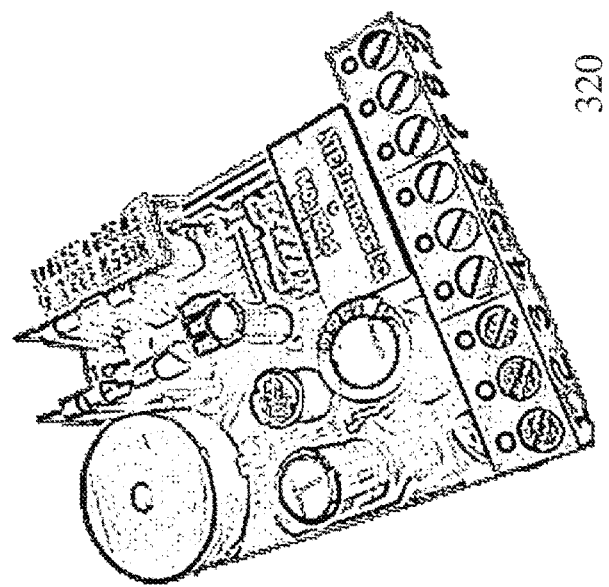
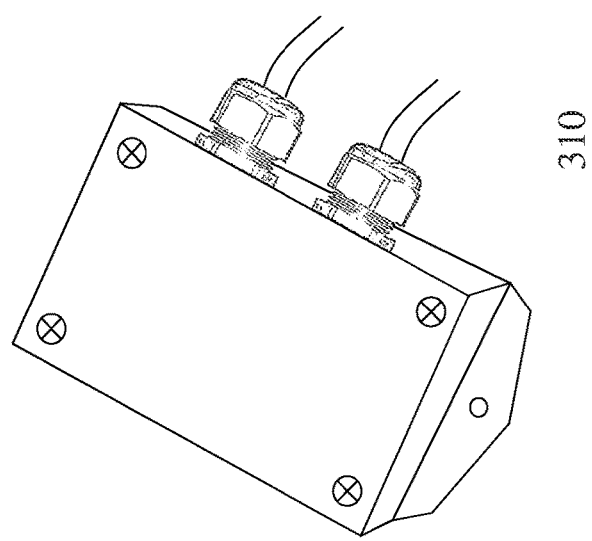
Figure 3

AUTOMATIC CLOSURE SYSTEM IMPACT DETECTION

CROSS-REFERENCE TO RELATED APPLICATIONS

This patent application claims under 35 USC 119(e) the benefit of U.S. Provisional Patent Application 62/108,703 filed on Jan. 28, 2015 entitled "Automatic Closure System Impact Detection."

BACKGROUND

This invention relates to automated closure systems and more particularly to impact detection within automated closure systems.

Within a wide range of commercial and residential environments automated closure systems, such as garage doors, automatically closing/opening doors, automating opening/closing windows for example, are employed to ease access and securing of these environments. For example, an automatic garage door allows the user to drive up, open the door, and drive into the garage without leaving their car and then once out of their car close the door without having to handle the large door. In other instances, automated closure systems provide access or eased access for those with disabilities, young children, the elderly, etc.

However, there is generally nothing within these automated closure systems to prevent the door closing upon something or someone without causing damage or injury. The exceptions being automobiles, where this issue was addressed by removing the ability to close the window without holding the window closing button or switch, and garage doors, where an optical sensor typically at ground level detects an obstruction if at this low level. In all other instances the door will close onto something or someone causing potentially catastrophic damage and injury, potentially even death.

Accordingly, it would be beneficial to provide a means of allowing such automated closure systems to detect an impact and automatically terminate their action.

Other aspects and features of the present invention will become apparent to those ordinarily skilled in the art upon review of the following description of specific embodiments of the invention in conjunction with the accompanying figures.

SUMMARY

It is an object of the present invention to address limitations within the prior art relating to automated closure systems and more particularly to impact detection within automated closure systems.

In accordance with an embodiment of the invention there is provided a method comprising:
providing an accelerometer responsive to motion of a closure forming part of an automatic closure system;
providing an output of the accelerometer to first and second comparator circuits, the first comparator circuit having a first reference voltage such that the output of the first comparator circuit is indicative of a direction of motion of the closure and the second comparator circuit having an adjustable second reference voltage such that the output of the second comparator circuit is scaled relative to this adjustable second reference voltage to adjust the sensitivity of the output of the second comparator;
providing a microcontroller coupled to the outputs of the first and second comparator circuits, the microcontroller for determining based upon the outputs of the first and second comparator circuits with time both a motion sequence of the closure and whether the closure has impacted an object; and
providing an interface circuit for communicating the output from the microcontroller to a remote controller circuit.

In accordance with an embodiment of the invention there is provided a device comprising:
an accelerometer responsive to motion of a closure forming part of an automatic closure system;
an output of the accelerometer to first and second comparator circuits, the first comparator circuit having a first reference voltage such that the output of the first comparator circuit is indicative of a direction of motion of the closure and the second comparator circuit having an adjustable second reference voltage such that the output of the second comparator circuit is scaled relative to this adjustable second reference voltage to adjust the sensitivity of the output of the second comparator;
a microcontroller coupled to the outputs of the first and second comparator circuits, the microcontroller for determining based upon the outputs of the first and second comparator circuits with time both a motion sequence of the closure and whether the closure has impacted an object; and
an interface circuit for communicating the output from the microcontroller to a remote controller circuit.

In accordance with an embodiment of the invention there is provided a system comprising:
an impact detector circuit comprising:
   an accelerometer responsive to motion of a closure forming part of an automatic closure system;
   an output of the accelerometer to first and second comparator circuits, the first comparator circuit having a first reference voltage such that the output of the first comparator circuit is indicative of a direction of motion of the closure and the second comparator circuit having an adjustable second reference voltage such that the output of the second comparator circuit is scaled relative to this adjustable second reference voltage to adjust the sensitivity of the output of the second comparator;
   a first microcontroller coupled to the outputs of the first and second comparator circuits, the first microcontroller for determining based upon the outputs of the first and second comparator circuits with time both a motion sequence of the closure and whether the closure has impacted an object; and
   an interface circuit for communicating the output from the microcontroller to a remote controller circuit; and
the remote controller circuit comprising;
   a filtering circuit for receiving and processing the output from the interface circuit within the impact detector;
   a second microcontroller for receiving the output from the filtering circuit and determining whether to at least one of trigger an alarm and communicate a control signal to a motor.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3 depicts first generation impact detector (transmitter) and controller (receiver) for interfacing to the automated closure system according to an embodiment of the invention;

DETAILED DESCRIPTION

The present invention is directed to automated closure systems and more particularly to impact detection within automated closure systems.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

Figure 1:
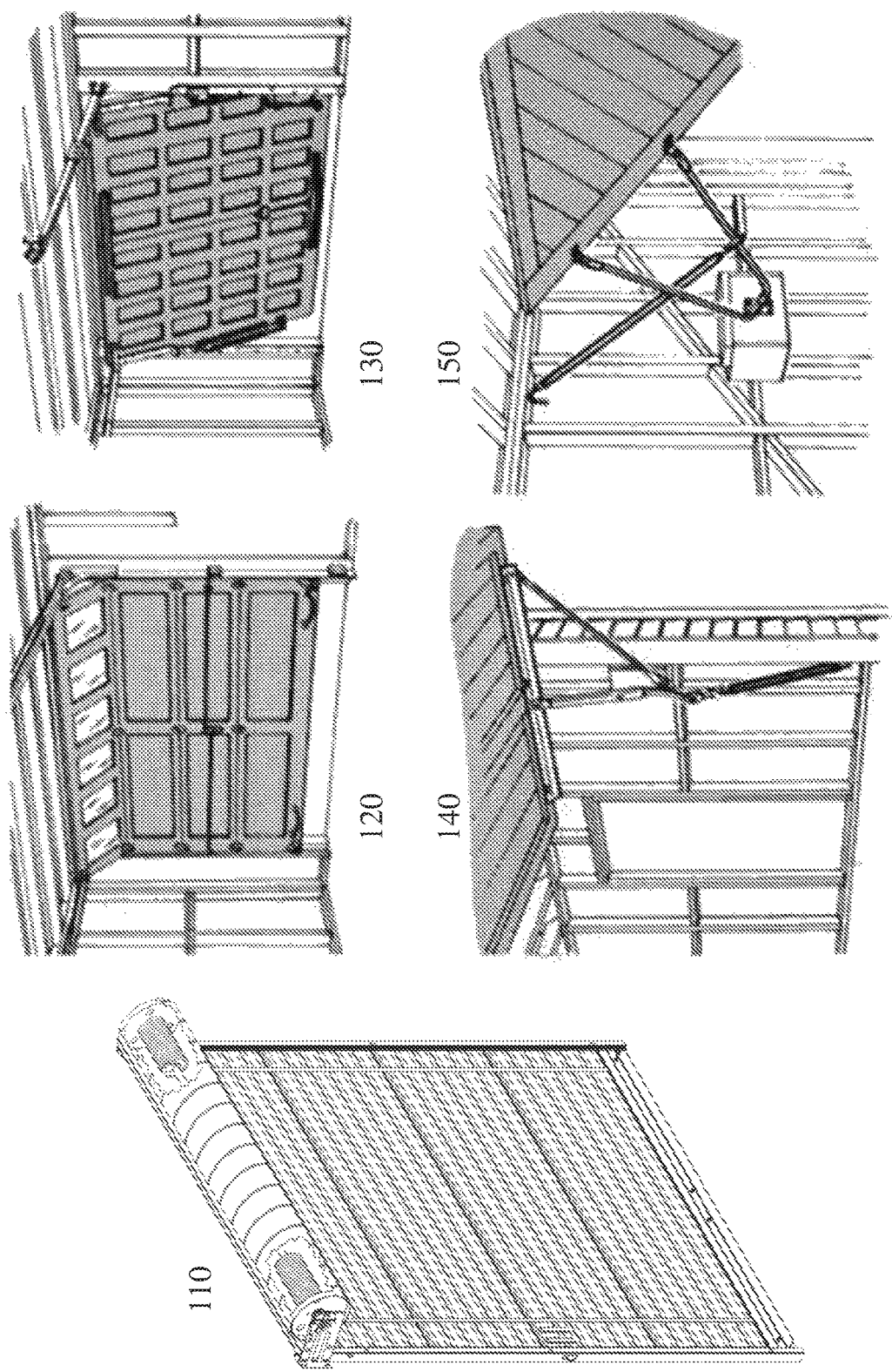
FIG. 1 depicts some common automated closure systems with which embodiments of the invention automatically detect impacts.

Referring to FIG. 1 there are depicted some common automated closure systems (AUCLOS) with which embodiments of the invention automatically detect impacts. Depicted are first to fifth AUCLOS 110 to 150 respectively. These being:

First AUCLOS 110 depicting a roll-up door characterised in that the door rolls up upon itself or unrolls under motorized control, for example at the top or side of the door, wherein the door is formed from a large number of small segments;

Second AUCLOS 120 depicting a sectional roll-up door characterised in that the door rolls up on or down a track above the entrance to which the sectional roll-up door relates under motorized control;

Third AUCLOS 130 depicts a swing-up door characterised in that the door lifts/drops as a single piece under motorized control which whilst mechanically simpler requires sufficient clearance in front of the AUCLOS 130 to allow free movement;

Fourth AUCLOS 140 depicts a jamb type AUCLOS characterised in that the door lifts/drops as a single piece under motorized control where the jamb type fitting provides for fittings that are secured to the door jambs only removing any ceiling fittings and can operate with very low headroom;

Fifth AUCLOS 150 depicts an offset pivot type AUCLOS characterised in that the door lifts/drops as a single piece under motorized control where the pivots are secured to a frame or walls.

Whilst the AUCLOS depicted in FIG. 1 are garage doors it would be evident that the principles of such AUCLOS may be applied to other doors, access points, etc. and in many instances may also be applied to other building features such as windows etc. Accordingly, each AUCLOS operates to open/close under direction of a motor which is typically controlled through the action of a controller, such as a wall mounted switch, a remote control key fob, etc.

Figure 2:
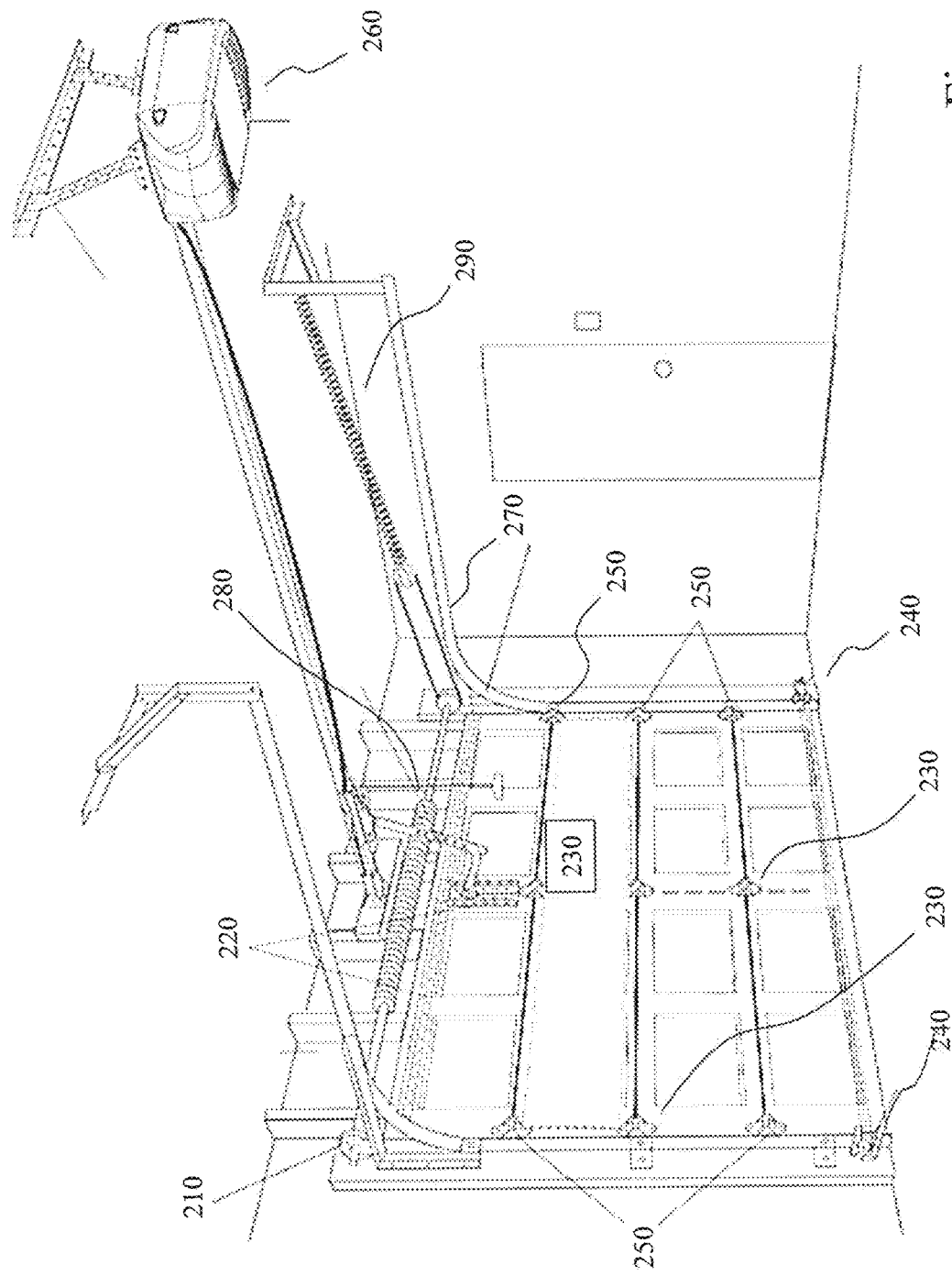
FIG. 2 depicts in detail an automated closure system with which embodiments of the invention automatically detect impacts.

Referring to FIG. 2 there is depicted in detail one type of AUCLOS which embodiments of the invention are compatible with and automatically detect impacts. As depicted the AUCLOS belongs to the category of second AUCLOS 120 being a sectional roll-up door comprising, in part, Drum 210 to which either a torsion spring and/or extension spring 290 are attached to control speed/rate of movement;

Horizontal and/or vertical reinforcement 220 for the door sections;

Hinges 230 allowing the sections of the door to move relative to one another;

Safety reversing sensor 240, typically optical, to detect if something is blocking the opening but as these are, typically, a couple of inches of the ground they can fail to detect many obstructions;

Rollers 250 to guide the door sections within the track 270;

Motor 260 to pull/release the chain attached to the door to move the uppermost door section;

Track 270;

Torsion spring 280; and

Extension spring 290.

Typically, during the installation of the AUCLOS limits are established for the motor 260 in order to establish the limits of its travel. In some instances, such as garage doors as depicted in FIG. 2, an optical sensor (e.g. infrared or visible), provides a floor level detection of an object blocking the limit of closure of the AUCLOS such that the motor is stopped and generally reverses to open the AUCLOS fully. However, a floor level detector, typically 2-3" (50-75 mm) off the floor will not detect many obstacles such as the bonnet or boot of a car projecting under the doorway but not blocking the sensor or a child standing with legs apart. Further, this sensor is designed to stop full final closure and crushing rather than any other problem. In many instances, such as AUCLOS windows etc. or where the door/window pivots about a vertical mount rather than a horizontal mount, e.g. third to fifth AUCLOS 130 to 150 respectively, no sensor(s) are employed. Accordingly, in the majority of instances there is no mechanism to prevent the AUCLOS continuing to close, continuing to open or attempting to continue either in the event of a problem. For example, impacting an object halfway through closing or opening or snagging an object during opening/closing etc. are not detected leading to damaged property, injury, maiming, and worse. Further, temperature sensors specifically programmed to automatically adjust the units sensitivity to allow for variances in the operation of a door due to exposure to extreme cold conditions can also be provided where needed.

Referring to FIG. 3 there are depicted first generation Impact Detector 310 and Controller 320 for interfacing to an AUCLOS according to an embodiment of the invention. The Impact Detector 310 provides sensing and transmits data to the Controller 320 which receives it and processes it to determine the status of the door (or window) and make decisions with respect to the control of the AUCLOS for the door (or window). Accordingly, the Impact Detector 310 may be viewed as a transmitter element within a monitored AUCLOS system whilst the Controller 320 may be viewed as a receiver element within the monitored AUCLOS system. Impact Detector 310 is intended to mount to the moving element of the AUCLOS, e.g. door or window, whilst the Controller 320 provides control signals to the controller of the motor driving the AUCLOS operation. As depicted Impact Detector 310 and Controller 320 exploit a wired interface connection between them wherein Controller 320 provides power to Impact Detector 310 and the Impact Detector provides data over the power line interface to the Controller 320. Optionally, within other embodiments of the invention the Impact Detector 310 and Controller 320 may derive power separately and have a discrete wired interface. In other embodiments of the invention they may be powered in combination or discretely with a wireless interface. Such a wireless interface may for example exploit free space optical communications protocols, ultrasonic communications, or RF/microwave communication protocols. Within the latter category the communications may be according to an International standard such as IEEE 802.11, IEEE 802.15, IEEE 802.16, IEEE 802.20, ITU-R 5.138, ITU-R 5.150, ITU-R 5.280, Zigbee, Bluetooth, Z-Wave, Wireless USB, and DASH7 for example.

Whilst a single Impact Detector 310 and Controller 320 are described in embodiments of the invention it would be evident that multiple Impact Detectors 310 may communicate with a single Controller 320 according to embodiments of the invention or to multiple controllers according to embodiments of the invention. Optionally, the Controller 320 may support communications to an alarm and/or control interface in addition to the motor or the motor controller. In these scenarios the triggering of an impact detection with respect to an AUCLOS may trigger for example a local alarm, a remote alarm, or result in an electronic communication to one or more predetermined electronic addresses, e.g. an alarm company or an owner of the property associated with the AUCLOS. In other embodiments of the invention the triggering of an alarm may also trigger an audiovisual feed, an image capture, an audio feed, or other communications. Accordingly, the owner of the property associated with the AUCLOS may be presented upon their smartphone or another electronic device audiovisual content relating to the trigger either sampled at the time of the trigger, sampled a predetermined period later, or fed live to them.

Figure 4A:
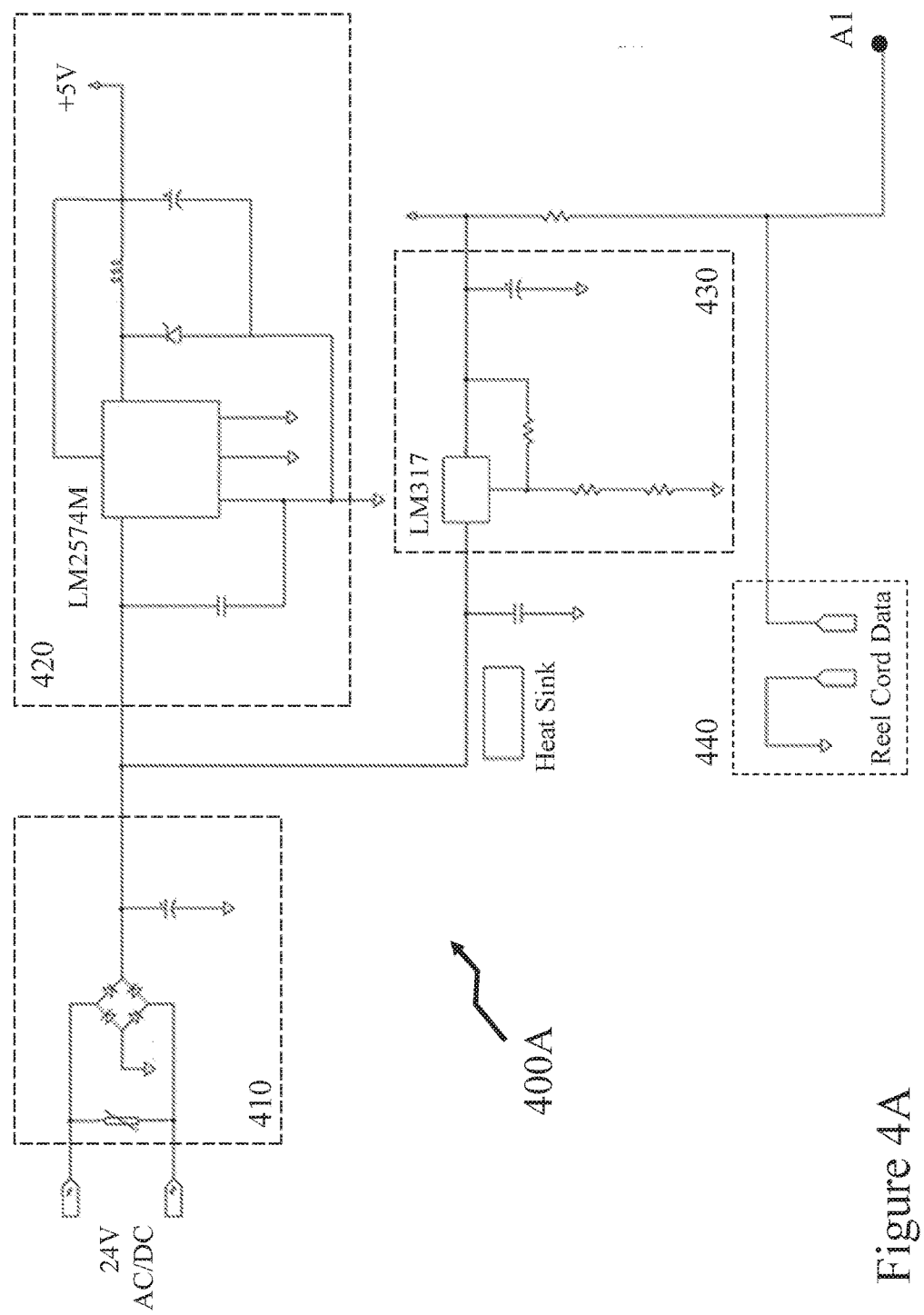
FIGS. 4A and 4B depict an exemplary electrical circuit for the first generation controller (receiver) of FIG. 3 as part of an impact detection system according to an embodiment of the invention.
Figure 4B:
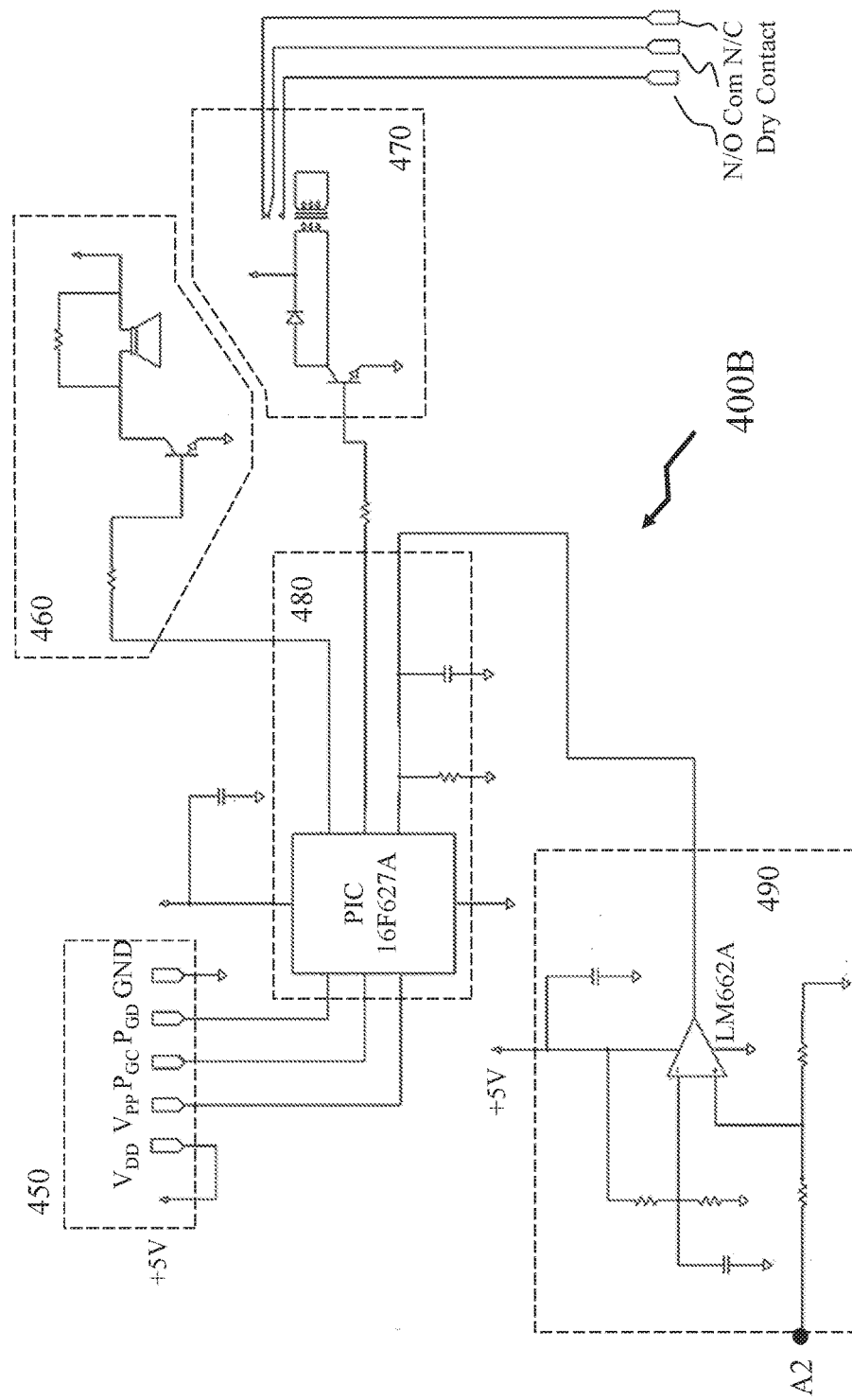

Referring to FIGS. 4A and 4B there is depicted an exemplary electrical circuit for the first generation controller, such as Controller 320 depicted in FIG. 3, forming part of an impact detection system according to an embodiment of the invention. The exemplary controller electrical circuit being depicted in first and second portions 400A and 400B that link at points A1-A2. Referring to first portion 400A in FIG. 4A the controller circuit comprises an AC-DC converter 410 which receives 24V AC or DC and whose output is coupled to Power Supply 420, which generates a stable 5V output power rail for the remainder of the controller comprising first and second portions 400A and 400B respectively. The AC-DC converter 410 is also coupled to Linking Cable Power Supply 430 which establishes a stable +15V output power rail which is coupled to point A1 and also to edge connector in order to provide power to the Impact Detector, such as Impact Detector 310, which is coupled to it via a Linking Cable, as the inventors refer to it, which is an electrical cable linking the Controller 320 to Impact Detector 310. This connection denoted as Pin 9 upon which the Impact Detector 310 data is also received and coupled to second portion 400B, depicted in FIG. 4B, to processing circuit 490 which cleans the data signal received from remote Impact Detector 310 before it is coupled to microcontroller 480. The microcontroller 480 is also coupled to beeper 460, to generate an audible signal, and relay 470. Relay 470 simply, as depicted, toggles a common line to either two pins N/C and N/O in order to provide control signals to the motor directly or to a controller controlling the motor.

The microcontroller 480 is also coupled to Programming Pins 450 allowing the microcontroller 480 to be programmed according to the application requirements of the AUCLOS, for example, to which it is connected for controlling the motor and sensing through the Impact Detector 310. As depicted Programming Pins 450 comprise PinA=$V_{DD}$[3.2V]; PinB=$V_{PP}$; PinC=PGC; PinD=PGD; and PinE=GND[0V]. Accordingly, the motor and/or motor controller may simply stop the motor, reverse the motor fully, or reverse the motor a predetermined amount within embodiments of the invention. Alternatively, more complex decisions and/or outputs may be generated from the microcontroller 480 as appropriate to the AUCLOS, its motor and/or its controller. As depicted microcontroller 480 is a PIC16F627A 8-bit PIC® Microcontroller from Microchip™ supporting 10-bit pulse width modulation (PWM) data interfaces. PWM being employed to provide the data from the Impact Detector 310 to the Controller 320 over the power line connecting them. Accordingly data transmitted by the Impact Detector 310 to the Controller 320 is processed by the microcontroller and used to generate a decision with respect to the AUCLOS state. Whilst the Controller 320 described provides a simple two-line control signal setting either output to a common signal line it would be evident that other outputs may be provided without departing from the scope of the invention including, but not limited to, serial data (e.g. to an alarm/control system), parallel data (e.g. to an alarm/control system), relay control signals (e.g. to disable a power supply of the motor), and wireless communications to another electronic device (e.g. the AUCLOS motor, an remote alarm/control signal).

Figure 5A:
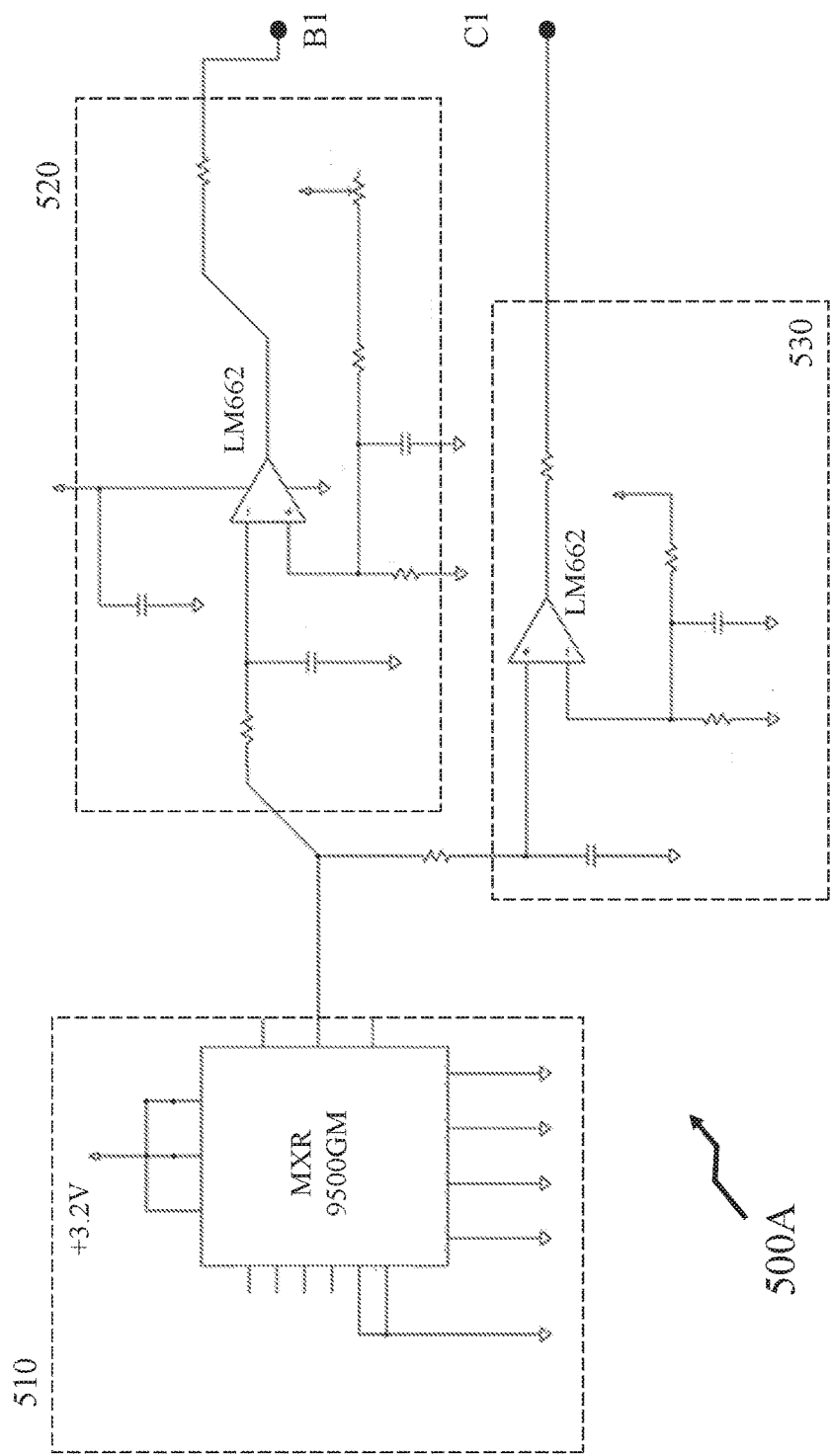
FIGS. 5A and 5B depict an exemplary electrical circuit for the first generation sensor (impact detector) (transmitter) of FIG. 3 as part of an impact detection system according to an embodiment of the invention.
Figure 5B:
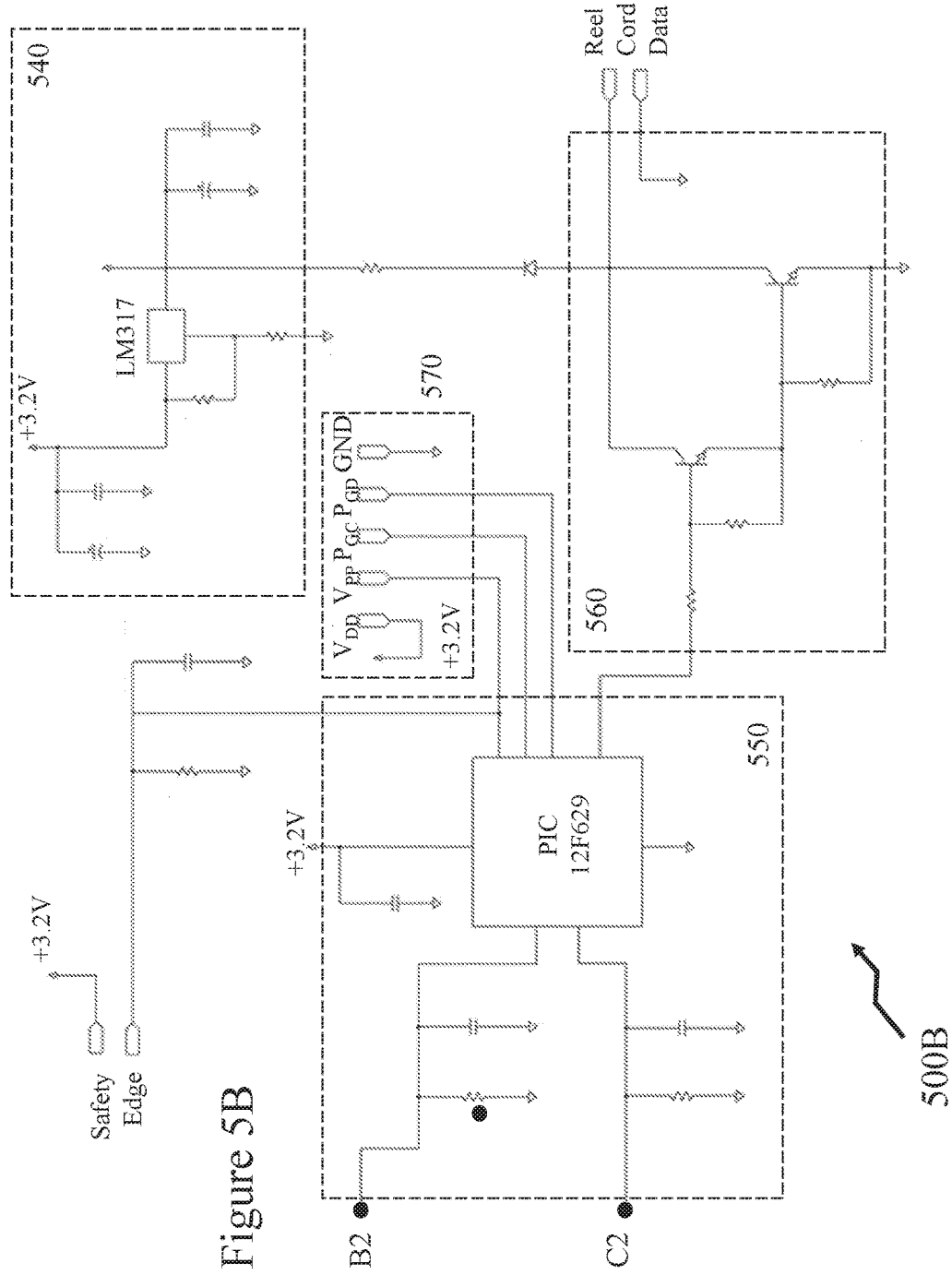

Now referring to FIGS. 5A and 5B there is depicted an exemplary electrical circuit for the impact detector (sensor), such as Impact Detector 310 in FIG. 3, forming part of an impact detection system according to an embodiment of the invention. The exemplary controller electrical circuit being depicted in first and second portions 500A and 500B that link at points B1-B2 and C1-C2. First portion 500A comprises Sensor Circuit 510 which in this exemplary circuit is based upon MXR 9500 MZ±1.5 g three axis accelerometer with ratiometric outputs that has a sensitivity of 500 mV/g. Whilst MXR 9500 MZ is a three-axis accelerometer supplied by MEMSIC, the exemplary circuit for the Impact Detector depicted in first and second portions 500A and 500B only exploits the Y-axis output. The Y-axis output is coupled to first Comparator Circuit 520 that compares the sensor signal from Sensor Circuit 510 with that provided by a reference potentiometer to threshold the sensor signal to determine whether an impact event has been triggered. First Comparator Circuit 520 also, through Variable Resistor 525, provides for sensitivity adjustment. Second Comparator Circuit 530 also receiving the Y-axis sensor signal from Sensor Circuit 510 in order to determine the direction of the AUCLOS motion.

The outputs from first and second Comparator Circuits 520 and 530 respectively are coupled to ports B1 and C1 of first portion 500A which are coupled to ports B2 and C2 of second portion 500B. These signals are coupled to a microcontroller within Microcontroller Circuit 550 which in this instance exploits a PIC16F629A 8-bit PIC® Microcontroller from Microchip™. Programming for the microcontroller is provided through Programming Pins 570 which comprise PinA=$V_{DD}$[3.2V]; PinB=$V_{PP}$; PinC=PGC; PinD=PGD; and PinE=GND[0V]. The output from the microcontroller within Microcontroller Circuit 550 is coupled to Data-over-Power (DOP) Circuit 560 which is coupled to the Linking Cable such that the data from the Microcontroller Circuit 550 is transmitted as PWM data over the Linking Cable to the controller, e.g. Controller 320. The electrical connection from the DOP Circuit 560 is also coupled to Power Circuit 540 which generates +8V and +3.2V DC voltages to power the first and second portions 500A and 500B respectively.

Accordingly, the Impact Detector 310 detects motion of the AUCLOS through the accelerometer sensor and determines based upon a pair of comparator outputs what the AUCLOS is doing and communicates this to Controller 320 wherein a determination of an action with respect to the motor driving the AUCLOS and/or communications to other electronic/electrical devices.

Whilst the descriptions supra in respect of Impact Detector exemplary electrical circuit and sensor implementation are based upon exploiting a single axis accelerometer, even though a low cost 3-axis accelerometer circuit is employed, it would be evident that alternate embodiments may employ two or more axes sensing. For example, employing X and Y axis accelerometers may allow orientation in horizontal and vertical orientations upon the AUCLOS rather than requiring one specific orientation. Equally, employing X, Y and Z axis accelerometers may allow orientation in horizontal, vertical, and perpendicular orientations upon the AUCLOS with respect to direction of motion rather than requiring one specific orientation. Optionally, the microcontrollers within the Impact Detector and Controller may process w or 3 axes signals to make a determination with respect to an impact and the AUCLOS. Optionally, such increased complexity control and decision circuits may provide for combined control/reporting functionality with respect to impacts of the AUCLOS and determination of other aspects such as relating to security when the AUCLOS is closed.

Typically, the Impact Detector may be mounted towards the bottom edge of the AUCLOS so that its motion is primarily within the sensed direction for the largest portion of the AUCLOS motion from open to closed, for example. However, in other instances, particularly with multiple axes sensing and control the positioning of the Impact Detector relating to the moving element of the AUCLOS may be relaxed. Optionally, multiple Impact Detectors may be deployed upon the AUCLOS.

Figure 6:
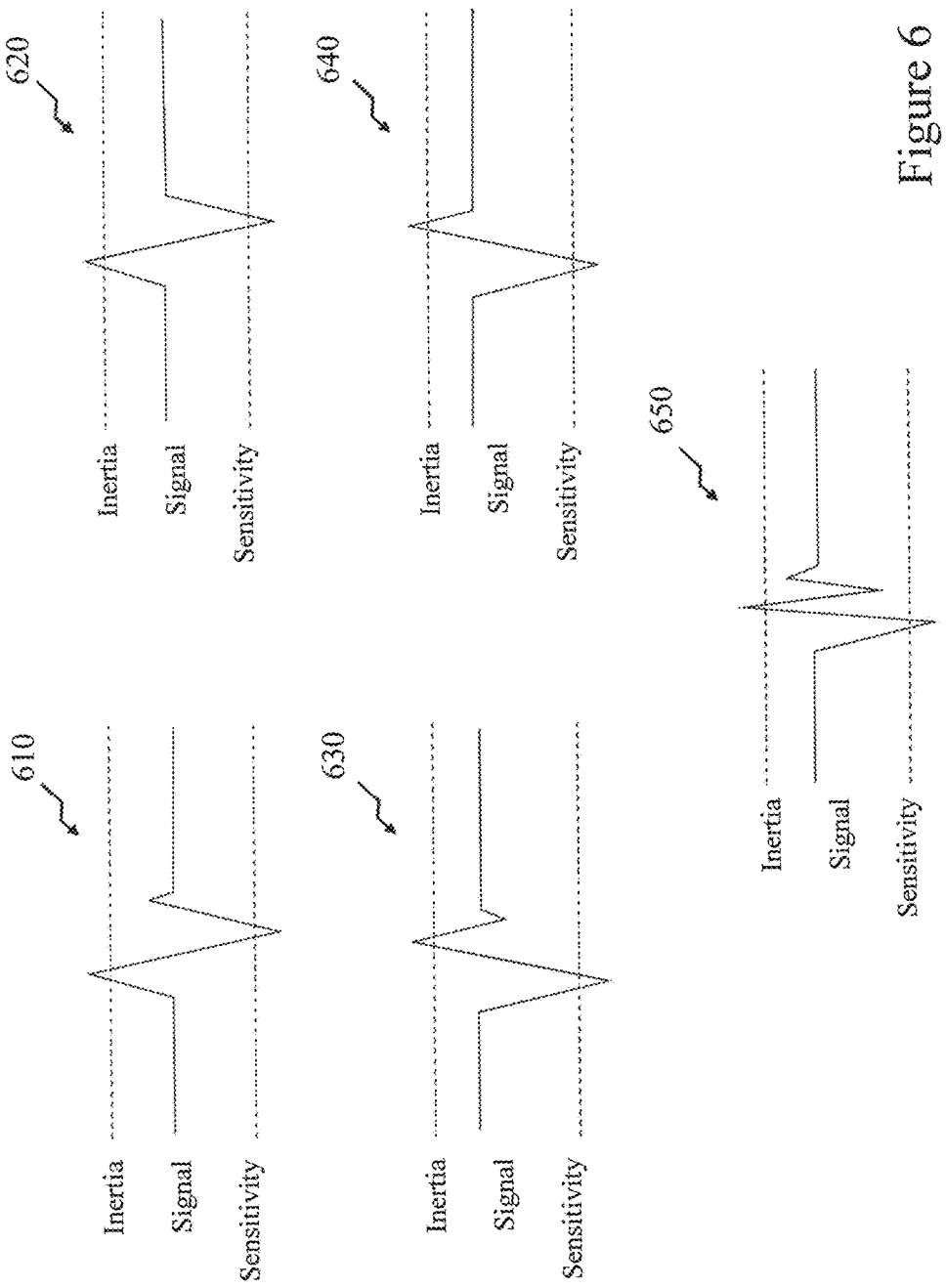
FIG. 6 depicts signal profiles for an impact sensor according to an embodiment of the invention for varying operating conditions of the automated closure system and a signal profile for impact.

Now referring to FIG. 6 there are depicted first to fifth signal profiles 610 to 650 respectively for an impact detector, e.g. Impact Detector 310, according to an embodiment of the invention for varying operating conditions of the automated closure system and a signal profile for impact. Within each of first to fifth signal profiles 610 to 650 respectively there are schematically depicted a sensitivity level representing the noise floor/noise limited signal determinable, a signal line representing an "inertia" signal of the AUCLOS. Against these are plotted the signal determined from the AUCLOS under different scenarios, namely:

First signal profile 610 opening then stopping, wherein the signal initially rises, drops, and then rises past its baseline output with some "overshoot" before returning to its baseline output;

Second signal profile 620 stopping then closing, wherein the signal initially rises, drops, and then rises back to its baseline output;

Third signal profile 630 stopping then opening, wherein the signal initially drops, rises, and then drops back to its baseline output with some "undershoot" before returning to its baseline output;

Fourth signal profile 640 closing then stopping, wherein the signal initially drops, rises, and then drops back to its baseline output; and Fifth signal profile 650 closing then impact, wherein the signal drops and then oscillates up and down before returning to its baseline output.

Accordingly, it would be evident that the signal derived from the sensor may be analysed to establish the motion of the AUCLOS. Accordingly, within Impact Detector 310 the output of the accelerometer within Sensor Circuit 510 is processed by first and second Comparator Circuits 520 and 530 and the outputs of these are then processed by the Microcontroller Circuit 550 and the output from this coupled to the Controller via the PWM data over the power lines coupling the Impact Detector and Controller.

Optionally, the first and second Comparator Circuits 520 and 530 may be replaced with an analog-to-digital converter (ADC) such that the digital representations of the sensor output is coupled to the microcontroller within the Microcontroller Circuit 550 wherein it is digitally processed to determine the action of the AUCLOS. Where multiple channels of the accelerometer are employed these may, optionally, be digitized with multiple ADCs before being processed by the microcontroller within the Impact Detector.

Figure 7A:
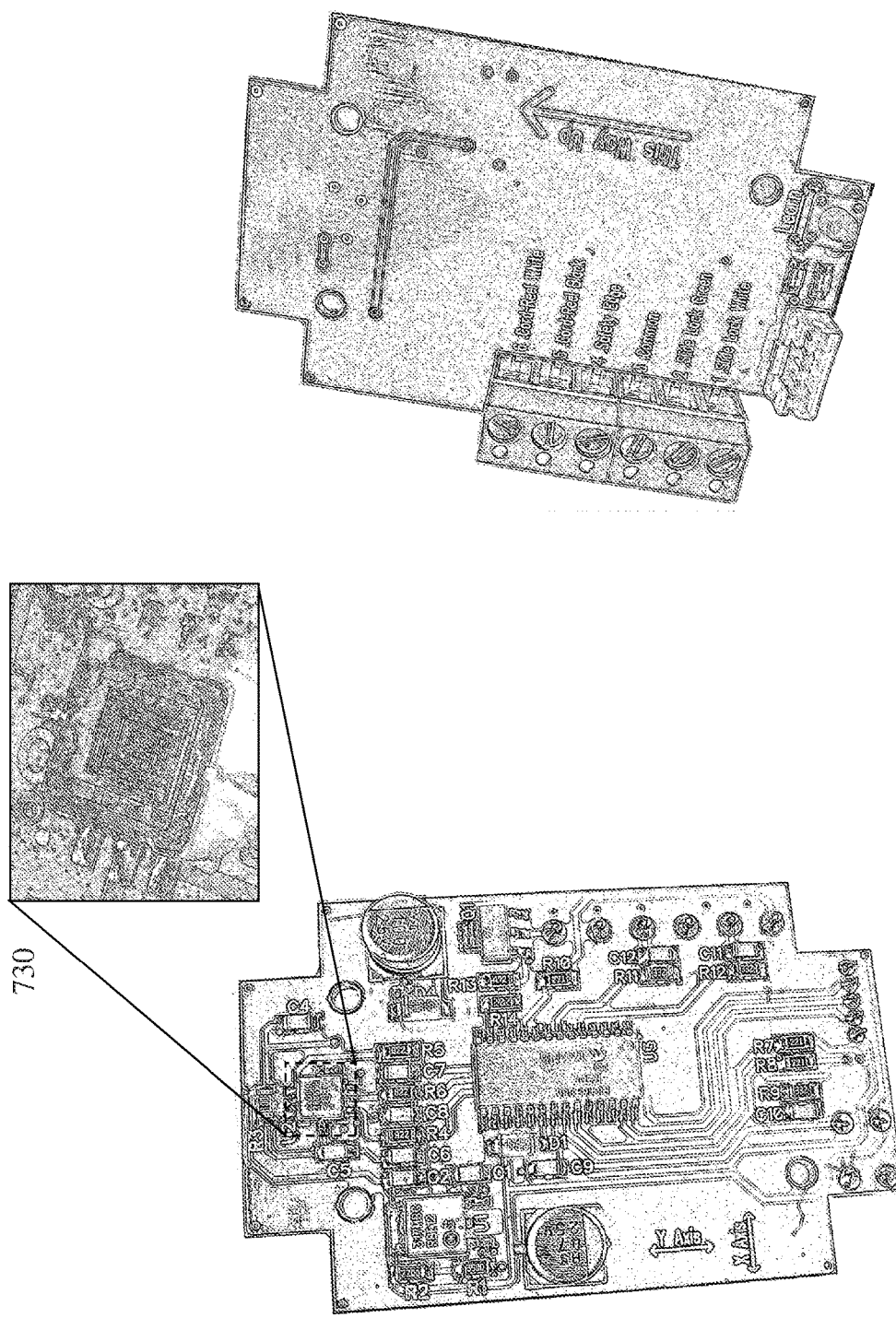
FIG. 7A depicts a second generation impact detector (transmitter) for interfacing to the controller (receiver) in FIGS. 8A and 8B respectively for an automated closure system according to an embodiment of the invention.
Figure 7B:
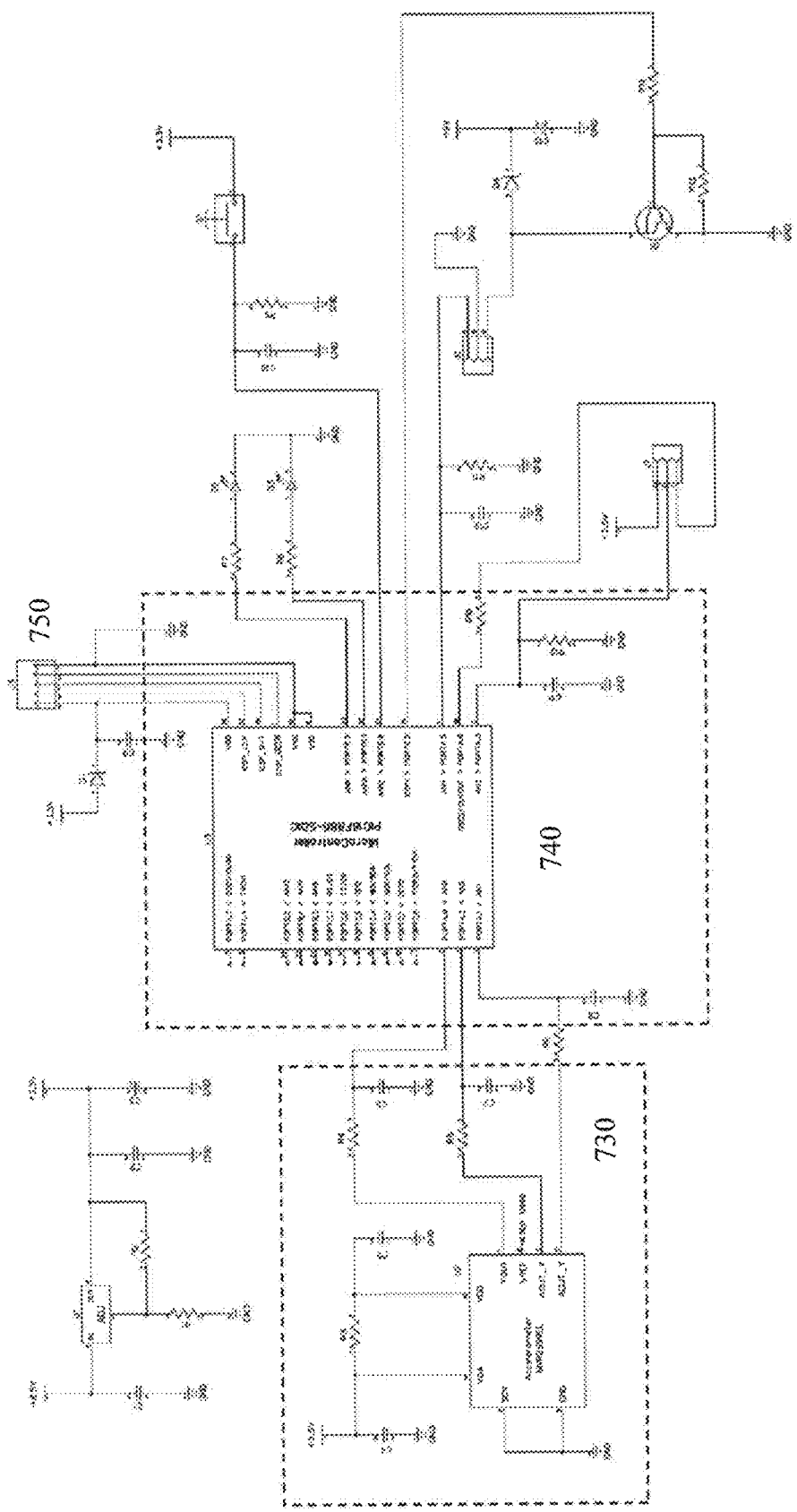
FIG. 7B depicts the electrical circuit for the second generation impact detector (transmitter) of FIG. 7A according to an embodiment of the invention.
Figure 8A:
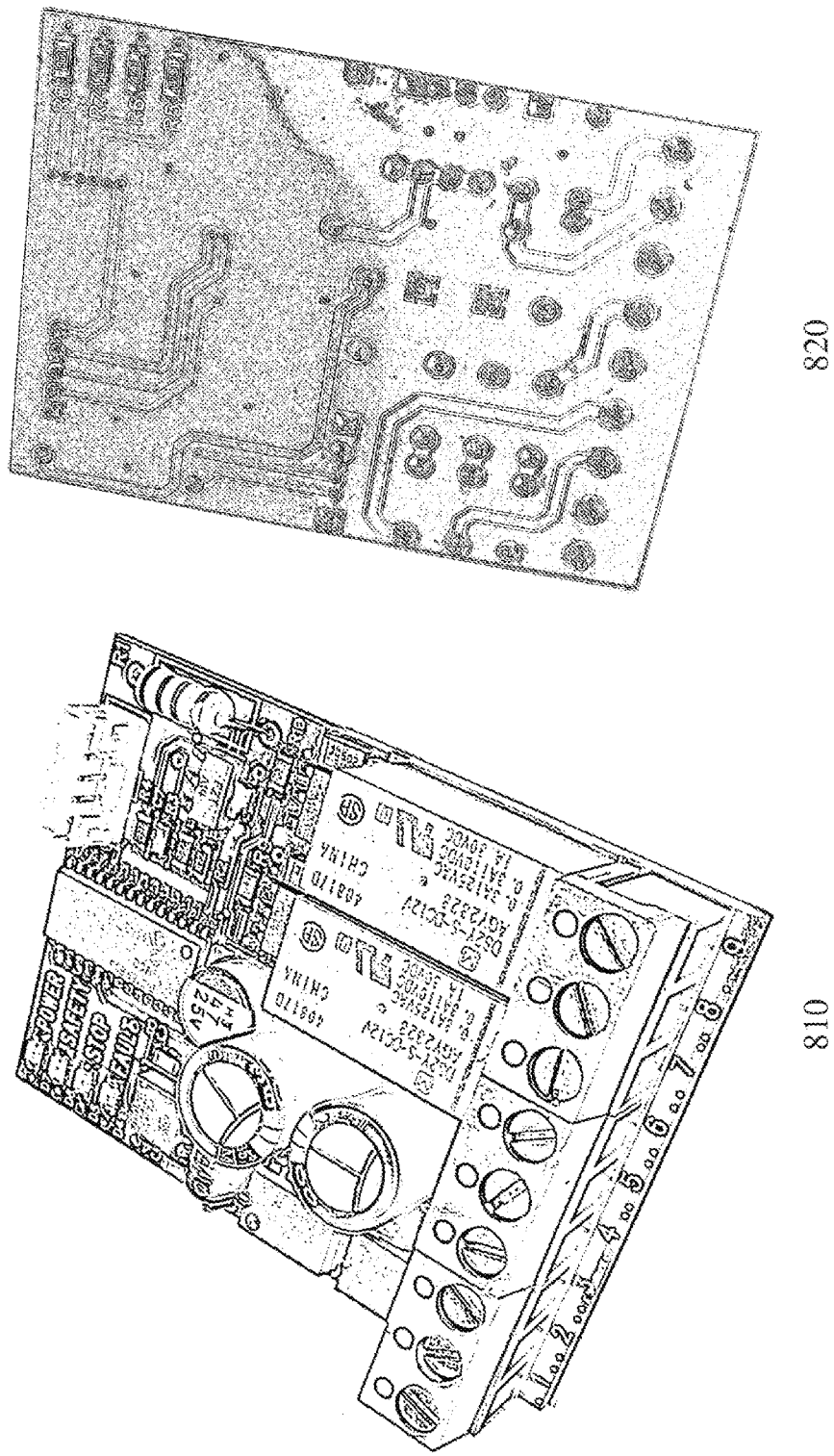
FIG. 8A depicts a second generation controller (receiver) for interfacing to the impact detector (transmitter) in FIGS. 7A and 7B respectively for an automated closure system according to an embodiment of the invention.
Figure 8B:
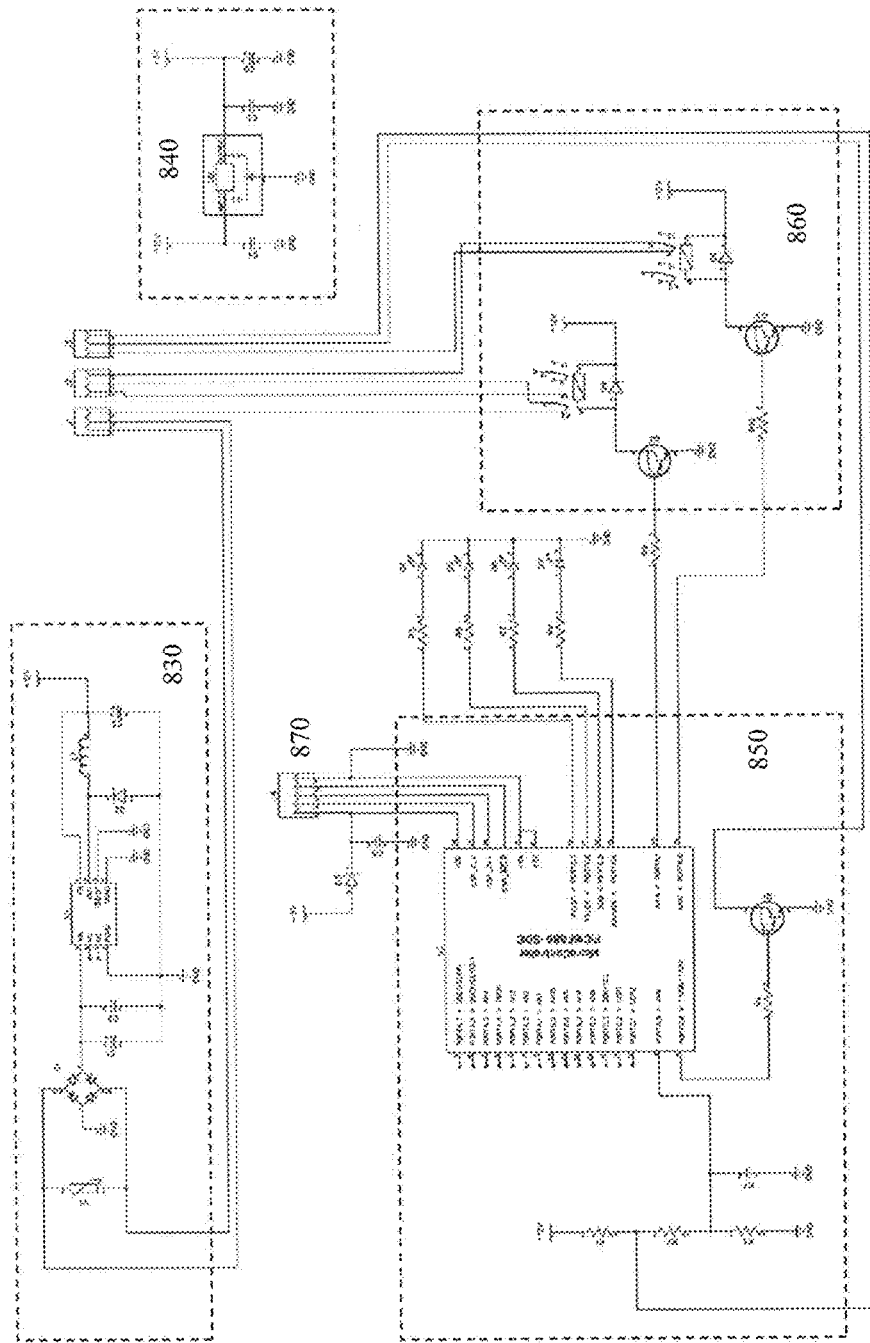
FIG. 8B depicts the electrical circuit for the second generation controller (receiver) of FIG. 8A according to an embodiment of the invention.

Referring to FIG. 7A there are depicted first and second side views 710 and 720 respectively for a second generation impact detector (transmitter) for interfacing to the controller (receiver) in FIGS. 8A and 8B respectively for an automated closure system according to an embodiment of the invention. The electrical circuit for the second generation impact detector (transmitter) of FIG. 7A according to an embodiment of the invention is depicted in FIG. 7B and comprises two main sub-circuits 730 to 750 respectively which relate to:

First sub-circuit 730 which relates to the dual-axis MEMS accelerometer; and Second sub-circuit 740 which comprises the microprocessor which receives the signal from the dual-axis MEMS accelerometer and provides output data to the connector 750 which is coupled to the controller (receiver).

Evident on the bottom of the second view 720 for the second generation impact detector (transmitter) is a button marked "Learn" which allows the microprocessor within the second generation impact detector (transmitter) to "learn" the characteristics of a particular AUCLOS installation in that the microprocessor may be sequenced through a series of characterisations of the output from the MEMS accelerometer such as "starting", "stopping", "moving", "impacting an object" and being "impacted by an object" allowing the microprocessor to establish MEMS outputs from each allowing, for example, a classification based decision making process to be applied to the detected accelerometer data.

Referring to FIG. 8A there are depicted first and second side views 810 and 820 respectively for a second generation controller (receiver) for an automated closure system according to an embodiment of the invention. The electrical circuit for the second generation controller (receiver) of FIG. 8A according to an embodiment of the invention is depicted in FIG. 8B and comprises four main sub-circuits 830 to 860 respectively which relate to:

First sub-circuit 830 which receives 24V AC or DC and generates a stable +12V output power rail for the remainder of the controller;

Second sub-circuit 840 which generates a stable +5V supply from the +12V generated by first sub-circuit 830;

Third sub-circuit 850 comprises the microprocessor which receives the signals from the connector 870 which is coupled to the impact detector (transmitter) and is coupled to fourth sub-circuit 860; and Fourth sub-circuit 860 which controls features of the AUCLOS in dependence upon the processed signal from the impact detector (transmitter) by the code in execution upon the microprocessor within the third sub-circuit 850.

Figure 9A:
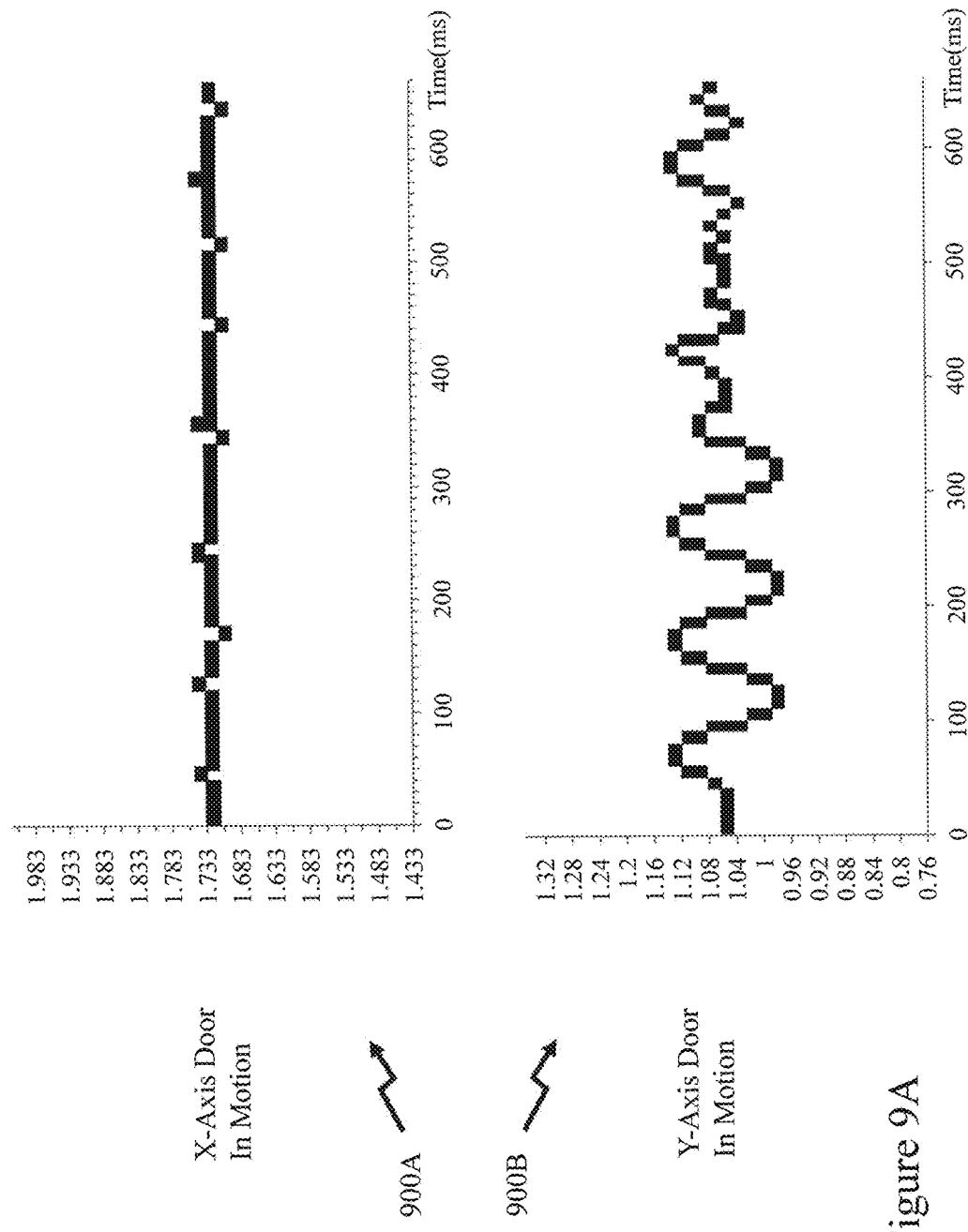
FIG. 9A depicts X-axis and Y-axis outputs from an automated closure system according to an embodiment of the invention exploiting the second generation impact detector and controller depicted in FIGS. 7A to 8B respectively when an "up-and-over" door in motion.

Now referring to FIG. 9A there are depicted in first and second graphs 900A and 900B respectively the detected X-axis and Y-axis outputs from the MEMS dual-axis accelerometer within the impact detector (transmitter) attached to a closure operating under control of an AUCLOS according to an embodiment of the invention. The system exploiting the second generation impact detector (transmitter) and controller (receiver) depicted in FIGS. 7A to 8B respectively when an "up-and-over" door is in motion. Accordingly, as evident, negligible X-axis motion is detected whilst a higher intensity signal is determined from the Y-axis as the door rolls up or down. The time period of the Y-axis signal being approximately 100 ms for the particular system operated.

Figure 9B:
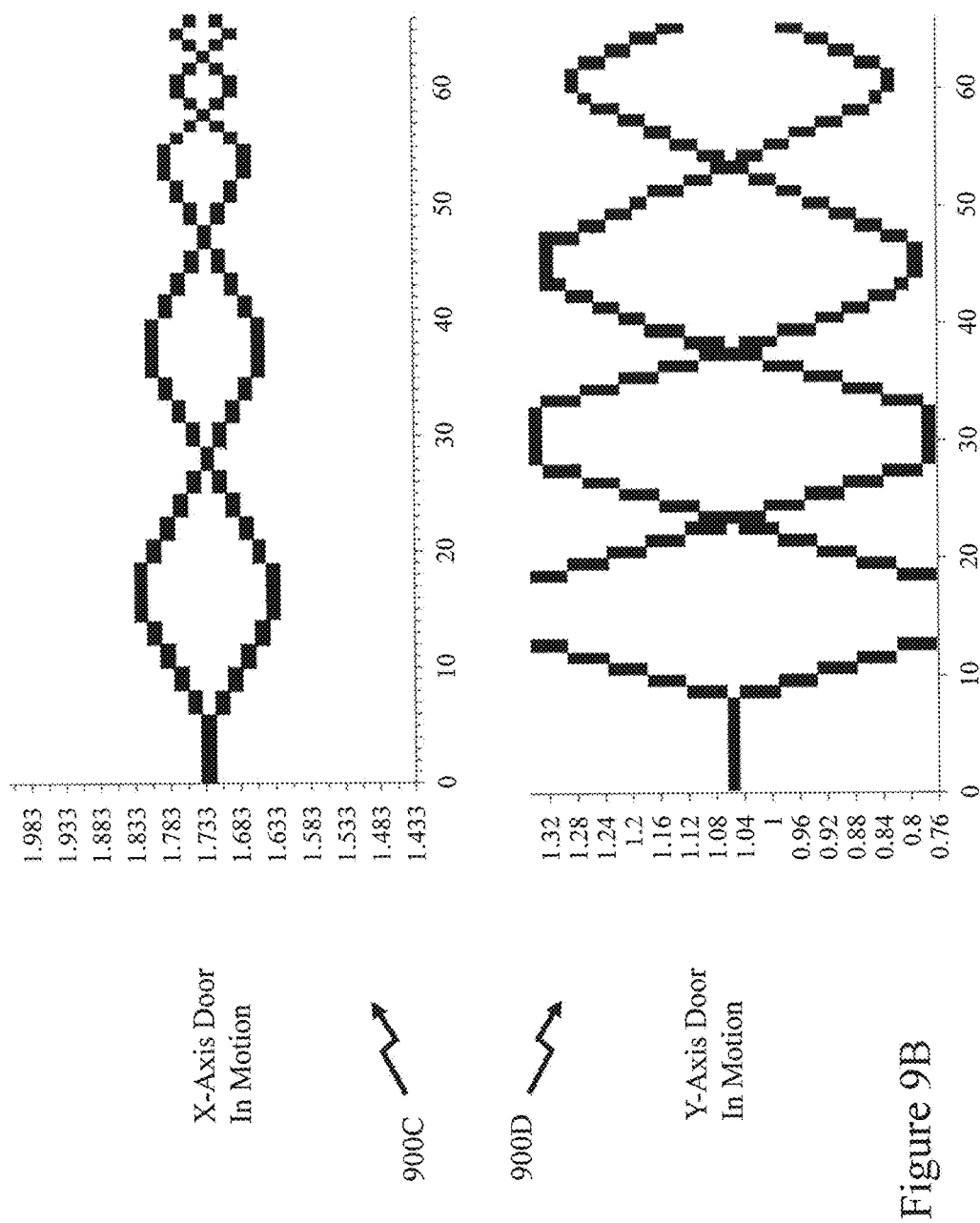
FIG. 9B depicts X-axis and Y-axis outputs from an automated closure system according to an embodiment of the invention exploiting the second generation impact detector and controller depicted in FIGS. 7A to 8B respectively when an "up-and-over" door experiences an impact event.

In contrast referring to FIG. 9B there are depicted third and fourth graphs 900C and 900D respectively for the X-axis and Y-axis outputs from the MEMS dual-axis accelerometer within the impact detector (transmitter) attached to a closure operating under control of an AUCLOS according to an embodiment of the invention. The system exploiting the second generation impact detector (transmitter) and controller (receiver) depicted in FIGS. 7A to 8B respectively when an "up-and-over" door experiences an impact event. Accordingly, as evident, both X-axis and Y-axis oscillations are evident in the output of the dual-axis MEMS accelerometer. These are predominantly within the Y-axis as the motion of the "up-and-over" door laterally (X-axis) is restricted through the rails either side, for example, but may be more prominent in the X-axis for other closure systems or both etc. according to the particular closure system design. However, it is evident that the period of the result oscillations is significantly shorter for the impact event to those observed with the closure in motion. The period in this instance being approximately 15 ms.

Within the embodiments of the invention described supra the accelerometer, an MXR 9500 MZ supplied by MEMSIC, is a microelectromechanical systems (MEMS) 3-axis accelerometer integrated into a single silicon integrated circuit it would be evident that other MEMS accelerometers may be employed in other technologies and/or manufacturers. Optionally, if all three-axis are being employed alternate configurations including single axis MEMS and dual axis MEMS in combination or multiple single axis MEMS to provide three axis accelerometer functionality or alternatively, just single or dual axis functionality. The selection being based upon cost, footprint, frequency response, sensitivity, etc.

Whilst embodiments of the invention have been described with respect to a discrete impact detector circuit/module operating in conjunction with a discrete controller circuit/module, even if they are connected by a power cord supplying power to the impact detector circuit and transmitting data to the controller circuit. It would be evident that alternatively, the essential features of these circuits are combined to a common discrete circuit and/or module for deployment in conjunction with an AUCLOS. Alternatively, a single controller may interface to multiple impact detector circuits including one integrated with it.

Within embodiments of the invention the wired power interface and data wired interface may be separated wired interfaces rather than exploiting a data-over-power configuration such as described and depicted supra in respect of FIGS. 3 to 5.

Within embodiments of the invention employing one or more accelerometers automatic cessation of the motor's action is determined from the impact detection circuit based upon the door impacting an object. However, in some instances the impact detection circuit may be triggered from a user action such as hitting and/or kicking the AUCLOS as initial contact between an AUCLOS and the human body is generally a soft impact until bone is reached. In such instances as the crushing/snagging begins the user may hit the door with a free limb or their torso, head.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A method comprising:
providing an accelerometer on a closure device that is part of an automatic closure system, wherein the accelerometer is responsive to motion of the closure device;
providing in real time a first output value of the accelerometer to a first analog-to-digital converter, the first analog-to-digital converter comparing the first output value of the accelerometer with a first reference value, wherein the first output value is indicative of a direction of motion of the closure device;

providing in real time a second output value of the accelerometer to a second analog-to-digital converter, the second analog-to-digital converter comparing the second output value of the accelerometer with an adjustable reference value, wherein the second output value is indicative of an impact of the closure device with an object;

providing a microcontroller coupled to the first and second analog-to-digital converters, the microcontroller configured for determining in real time based upon the first and second output values whether to perform an action with respect to operation of the automatic closure system, wherein the action is one of a plurality of actions stored in the microcontroller; and providing an interface circuit for communicating an output from the microcontroller to a remote controller circuit, wherein upon a positive determination, the microcontroller determines which action from the plurality of actions should be performed relative to the current operation of the automatic closure system and provides the output to the interface circuit, which when communicated to the remote controller circuit, causes the determined action with respect to operation of the automatic closure system to be performed.

2. The method according to claim 1, wherein the remote controller circuit comprises:
a filtering circuit for receiving and processing the output from the interface circuit, wherein the microcontroller receives the output from the filtering circuit and determines whether to at least one of trigger an alarm and communicate a control signal to a motor controlling motion of the closure device.

3. The method according to claim 1, wherein the interface circuit transmits data to the remote controller via a wired power interface which also provides a power rail supplying power via a power supply circuit to the accelerometer, microcontroller, and the first and second analog-to-digital converters, wherein the wired power interface is coupled to the remote controller.

4. The method according to claim 1, wherein the first and second analog-to-digital converters are the same analog-to-digital converter, and the adjustable reference value adjusts the sensitivity of the second analog-to-digital converter to detecting an impact.

5. The method according to claim 1, wherein the action with respect to the operation of the automatic closure system is one of stopping a motor driving the automatic closure system, reversing the motor driving the automatic closure system fully, and reversing the motor driving the automatic closure system a predetermined amount.

6. The method according to claim 1, wherein
either
upon determining to perform the action the microcontroller triggers at least one of a local alarm, a remote alarm, and an electronic communication to one or more electronic addresses;
or
the remote controller circuit triggers at least one of a local alarm, a remote alarm, and an electronic communication to one or more electronic addresses in dependence upon the output received from the microcontroller.

7. The method according to claim 6, wherein the triggering of at least one of the local alarm and the remote alarm also triggers at least one of an audiovisual feed, an image capture and an audio feed.

8. The method according to claim 1, wherein the action relative to the operation of the closure device is one of reversing the motor driving the closure device fully and reversing the motor driving the closure device a predetermined amount.

9. A device comprising:
an accelerometer responsive to motion of a closure device forming part of an automatic closure system;
a first analog-to-digital converter configured for receiving in real time a first output value of the accelerometer, the first analog-to-digital converter comparing the first output value of the accelerometer with a first reference value, wherein the first output value is indicative of a direction of motion of the closure device;
a second analog-to-digital converter configured for receiving in real time a second output value of the accelerometer, the second analog-to-digital converter comparing the second output value of the accelerometer with an adjustable second reference value, wherein the second reference value is indicative of an impact of the closure device with an object;
a microcontroller coupled to the first and second analog-to-digital converters, the microcontroller configured for determining in real time based upon the first and second output values whether to perform an action from a plurality of actions with respect to operation of the automatic closure system; and
an interface circuit for communicating an output from the microcontroller to a remote controller circuit,
wherein upon a positive determination, the microcontroller determines which action from the plurality of actions should be performed relative to the current operation of the automatic closure system and provides the output to the interface circuit, which when communicated to the remote controller circuit, causes the determined action with respect to operation of the automatic closure system to be performed.

10. The device according to claim 9, further comprising;
a power interface circuit which receives power from the remote controller circuit via a wired link and couples the interface circuit to the wired link;
a power supply circuit for receiving the power from the power interface circuit and generating the required power supply rails for the accelerometer, microcontroller, and the first and second analog-to-digital converters.

11. The device according to claim 9, wherein the first and second analog-to-digital converters are the same analog-to-digital converter, and the second reference value adjusts the sensitivity of the second analog-to-digital converter to detecting an impact.

12. The device according to claim 9, wherein the action with respect to the operation of the automatic closure system is one of stopping a motor driving the closure device, reversing the motor driving the closure device fully, and reversing the motor driving the closure device a predetermined amount.

13. The device according to claim 9, wherein
either
upon determining to trigger an alarm the second microcontroller triggers at least one of a local alarm, a remote alarm, and an electronic communication to one or more electronic addresses;

or the remote controller circuit triggers at least one of a local alarm, a remote alarm, and an electronic communication to one or more electronic addresses in dependence upon the output received from the microcontroller.

14. The device according to claim 13, wherein the triggering of at least one of the local alarm and the remote alarm also triggers at least one of an audiovisual feed, an image capture and an audio feed.

15. The device according to claim 9, wherein the action relative to the operation of the closure device is one of reversing the motor driving the closure device fully and reversing the motor driving the closure device a predetermined amount.

16. A system comprising:
an impact detector circuit comprising:
an accelerometer responsive to motion of a closure device forming part of an automatic closure system;
a first comparator circuit for receiving in real time an output of the accelerometer, the first comparator circuit comparing the output of the accelerometer with a first reference voltage such that the output of the first comparator circuit is indicative of a direction of motion of the closure device;
a second comparator circuit for receiving in real time the output of the accelerometer, the second comparator circuit comparing the output of the accelerometer with an adjustable second reference voltage such that the output of the second comparator circuit is indicative of an impact of the closure device with an object;
a first microcontroller coupled to the outputs of the first and second comparator circuits, the first microcontroller for determining in real time based upon the outputs of the first and second comparator circuits with time both a motion sequence of the closure and whether the closure has impacted an object, and upon a positive determination, the microcontroller determining which action from a plurality of actions should be performed relative to the current operation of the automatic closure system and providing an output to the interface circuit established in dependence upon the determined action to be performed; and
an interface circuit for communicating the output from the microcontroller to a remote controller circuit; and
the remote controller circuit comprising;
a filtering circuit for receiving and processing the output from the interface circuit within the impact detector;
a second microcontroller for receiving the output from the filtering circuit and determining whether to at least one of trigger an alarm and communicate a control signal to a motor controlling motion of the automatic closure system.

17. The system according to claim 16, wherein
the impact detector circuit further comprises;
a power interface circuit which receives power from the remote controller circuit via a wired link and couples the interface circuit to the wired link;
a first power supply circuit for receiving the power from the power interface circuit and generating the required power supply rails for the accelerometer, first microcontroller, and first and second comparator circuits; and
the remote controller circuit further comprises:
a second power supply circuit for receiving an input power supply and generating the required power supply rails of the second microcontroller and filtering circuit and providing the power to the wired link.

18. The system according to claim 16, wherein
the interface circuit within the impact detector circuit comprises a wireless transmitter operating according to a predetermined wireless standard; and
the remote controller circuit comprise a wireless receiver operating according to a predetermined wireless standard for receiving data from the wireless transmitter and coupling this received signal to the filtering circuit.

19. The system according to claim 16, wherein the second reference voltage adjusts the sensitivity of the second comparator to detecting an impact.

20. The system according to claim 16, wherein the control signal relates to one of stopping a motor driving the closure device, reversing the motor driving the closure device fully, and reversing the motor driving the closure device a predetermined amount.

21. The system according to claim 16, wherein upon determining to trigger the alarm the second microcontroller triggers at least one of a local alarm, a remote alarm, and an electronic communication to one or more electronic addresses.

22. The system according to claim 16, wherein upon determining to trigger the alarm the second microcontroller also triggers at least one of an audiovisual feed, an image capture and an audio feed.

23. The system according to claim 16, wherein the action relative to the operation of the closure device is one of reversing the motor driving the closure device fully and reversing the motor driving the closure device a predetermined amount.

* * * * *